United States Patent
Choi et al.

(10) Patent No.: US 11,355,788 B2
(45) Date of Patent: Jun. 7, 2022

(54) POUCH-TYPE SECONDARY BATTERY PACK INCLUDING PROTECTION CIRCUIT MODULE

(71) Applicant: LG CHEM, LTD., Seoul (KR)

(72) Inventors: Sung-Ho Choi, Daejeon (KR); Dae-Ho Jung, Daejeon (KR); Sung-Jin Oh, Daejeon (KR); Ki-Deok Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 433 days.

(21) Appl. No.: 16/473,506

(22) PCT Filed: Sep. 21, 2018

(86) PCT No.: PCT/KR2018/011333
§ 371 (c)(1),
(2) Date: Jun. 25, 2019

(87) PCT Pub. No.: WO2019/066441
PCT Pub. Date: Apr. 4, 2019

(65) Prior Publication Data
US 2020/0144677 A1    May 7, 2020

(30) Foreign Application Priority Data
Sep. 28, 2017  (KR) .................. 10-2017-0126531

(51) Int. Cl.
*H01M 10/42* (2006.01)
*H02J 7/00* (2006.01)
(Continued)

(52) U.S. Cl.
CPC .......... *H01M 10/425* (2013.01); *H01M 50/10* (2021.01); *H01M 50/543* (2021.01); *H02J 7/00302* (2020.01); *H01M 2010/4271* (2013.01)

(58) Field of Classification Search
CPC ....... H01M 10/425; H01M 2010/4721; H01M 50/10; H01M 50/543; H01M 50/557; H01M 50/572; H02J 7/00302; Y02E 60/10
See application file for complete search history.

(56) References Cited

U.S. PATENT DOCUMENTS

| 8,435,655 B2 | 5/2013 | Koh et al. |
| 8,778,531 B2 | 7/2014 | Lee |

(Continued)

FOREIGN PATENT DOCUMENTS

| CN | 1758476 A | 4/2006 |
| CN | 1838473 A | 9/2006 |

(Continued)

OTHER PUBLICATIONS

European Search Report dated Feb. 27, 2020 in EP Patent Application No. 18860026.6.
(Continued)

*Primary Examiner* — Victoria H Lynch
(74) *Attorney, Agent, or Firm* — Birch, Stewart, Kolasch & Birch, LLP

(57) ABSTRACT

A pouch-type secondary battery pack having a simplified manufacturing process with a reduced number of components, including a battery cell in which an electrode assembly is sealed in a pouch exterior together with an electrolyte, the battery cell having an electrode lead formed at one side thereof; and a protection circuit module having a printed circuit board with a protection circuit formed thereon and a (Continued)

lead connection plate formed at one surface of the printed circuit board so that the printed circuit board is electrically connected to the electrode lead of the battery cell, the protection circuit module having an exposing portion formed at the other surface of the printed circuit board to expose at least a portion of the lead connection plate.

18 Claims, 6 Drawing Sheets

(51) Int. Cl.
  *H01M 50/10* (2021.01)
  *H01M 50/543* (2021.01)

(56) References Cited

U.S. PATENT DOCUMENTS

| | | | |
|---|---|---|---|
| 2006/0093897 A1 | 5/2006 | Choi et al. | |
| 2006/0214632 A1 | 9/2006 | Lee et al. | |
| 2008/0118820 A1 | 5/2008 | Jang et al. | |
| 2009/0087694 A1 | 4/2009 | Park | |
| 2009/0176156 A1 | 7/2009 | Lee | |
| 2010/0143788 A1 | 6/2010 | Koh et al. | |
| 2011/0159323 A1 | 6/2011 | Kim | |
| 2011/0236727 A1 | 9/2011 | Jang | |
| 2012/0121945 A1 | 5/2012 | Kim | |
| 2012/0270074 A1 | 10/2012 | Koh | |
| 2013/0130065 A1 | 5/2013 | Park et al. | |
| 2013/0149561 A1 | 7/2013 | Hong et al. | |
| 2013/0171508 A1 | 7/2013 | Kim | |
| 2013/0280558 A1 | 10/2013 | Hur et al. | |
| 2014/0178715 A1* | 6/2014 | Koh | H01M 10/4257 429/7 |
| 2014/0287279 A1 | 9/2014 | Kim et al. | |
| 2014/0287280 A1 | 9/2014 | Kim et al. | |
| 2014/0302372 A1 | 10/2014 | Kim et al. | |
| 2014/0370356 A1 | 12/2014 | Yi | |
| 2015/0064502 A1 | 3/2015 | Hong | |
| 2015/0263389 A1 | 9/2015 | Moon | |
| 2015/0303412 A1 | 10/2015 | Lee | |
| 2016/0072154 A1 | 3/2016 | Kim et al. | |
| 2016/0233554 A1 | 8/2016 | Choi et al. | |
| 2016/0240892 A1 | 8/2016 | Ahn et al. | |
| 2017/0062794 A1 | 3/2017 | Lee et al. | |

FOREIGN PATENT DOCUMENTS

| | | |
|---|---|---|
| CN | 101478034 A | 7/2009 |
| CN | 100530810 C | 8/2009 |
| CN | 102751454 A | 10/2012 |
| CN | 103165833 A | 6/2013 |
| CN | 103988335 A | 8/2014 |
| CN | 104081554 A | 10/2014 |
| CN | 104170117 A | 11/2014 |
| CN | 104241578 A | 12/2014 |
| CN | 104969383 A | 10/2015 |
| CN | 106486713 A | 3/2017 |
| CN | 206322747 U | 7/2017 |
| KR | 10-0947963 B1 | 3/2010 |
| KR | 10-1122790 B1 | 3/2012 |
| KR | 10-1211859 B1 | 12/2012 |
| KR | 10-1223730 B1 | 1/2013 |
| KR | 10-2013-0065686 A | 6/2013 |
| KR | 10-2013-0079956 A | 7/2013 |
| KR | 10-2013-0135063 A | 12/2013 |
| KR | 10-2014-0066512 A | 6/2014 |
| KR | 10-2015-0037154 A | 4/2015 |
| KR | 10-2015-0107475 A | 9/2015 |
| KR | 10-2016-0050941 A | 5/2016 |
| KR | 10-1619925 B1 | 5/2016 |
| KR | 10-2016-0104931 A | 9/2016 |

OTHER PUBLICATIONS

International Search Report issued in PCT/KR2018/011333 (PCT/ISA/210), dated Jan. 22, 2019.

* cited by examiner

Prior Art

POUCH-TYPE SECONDARY BATTERY PACK INCLUDING PROTECTION CIRCUIT MODULE

TECHNICAL FIELD

The present disclosure relates to a pouch-type secondary battery pack including a protection circuit module, and more particularly, to a pouch-type secondary battery pack having a simplified manufacturing process with a reduced number of components.

The present application claims priority to Korean Patent Application No. 10-2017-0126531 filed on Sep. 28, 2017 in the Republic of Korea, the disclosures of which are incorporated herein by reference.

BACKGROUND ART

Recently, the demand for portable electronic products such as notebook computers, video cameras and portable telephones has increased sharply, and electric vehicles, energy storage batteries, robots, satellites and the like have been developed in earnest. Accordingly, high-performance secondary batteries allowing repeated charging and discharging are being actively studied.

Secondary batteries currently commercialized include nickel cadmium batteries, nickel hydrogen batteries, nickel zinc batteries, lithium secondary batteries and so on. Among them, the lithium secondary batteries are more highlighted in comparison to nickel-based secondary batteries due to advantages such as free charging and discharging, caused by substantially no memory effect, very low self-discharge rate, and high energy density.

The lithium secondary battery mainly uses lithium-based oxides and carbonaceous materials as a positive electrode active material and a negative electrode active material, respectively. In addition, the lithium secondary battery includes an electrode assembly in which a positive electrode plate coated with the positive electrode active material and a negative electrode plate coated with the negative electrode active material are disposed with a separator being interposed therebetween, and an exterior hermetically containing the electrode assembly together with an electrolyte.

Meanwhile, the lithium secondary battery may be classified into a can-type secondary battery in which the electrode assembly is included in a metal can and a pouch-type secondary battery in which the electrode assembly is included in a pouch made of aluminum laminate sheets, depending on the shape of the battery case. In addition, the can-type secondary battery may also be classified into a cylindrical battery and a rectangular battery depending on the shape of the metal can.

Here, the pouch of the pouch-type secondary battery generally includes a lower sheet and an upper sheet covering the lower sheet, and the electrode assembly in which a positive electrode, a negative electrode are and a separator are stacked and rolled is accommodated in the pouch. In addition, after the electrode assembly is accommodated, the edges of the upper sheet and the lower sheet are sealed by thermal fusion or the like. Moreover, an electrode tab drawn from each electrode is coupled to the electrode lead, and an insulating film may be added to a portion of the electrode lead that is in contact with the sealing portion.

As described above, the pouch-type secondary battery may be freely configured in various forms and realize a secondary battery of the same capacity with smaller volume and mass. However, since the pouch-type secondary battery uses a soft pouch as a container, unlike the can-type secondary battery, the pouch-type secondary battery may suffer from a low mechanical strength and a possibility of moisture infiltration, and may have a safety problem since it may cause explosion of the battery due to high temperature and high pressure inside the battery, which may be caused by an abnormal operating state of the battery, such as an internal short circuit, an overcharged state exceeding an allowable current and voltage, exposure to high temperature, an impact by dropping or the like.

In addition, the pouch-type secondary battery includes various inflammable materials and thus has a serious safety problem such as ignition and explosion, caused by overcharge, overcurrent, other physical external shock, and the like. Thus, the secondary battery includes a protection circuit module (PCM) electrically connected to the battery cell to effectively control abnormal conditions such as overcharge.

FIG. 1 is an exploded perspective view schematically showing some components of a conventional pouch-type secondary battery pack.

Referring to FIG. 1, the conventional secondary battery pack 10 uses a connection member 13 for electrically connecting a protection circuit module 12 and a battery cell 11. The connection member 13 is respectively coupled to electrode leads 14, 15 formed at the battery cell 11 and a connection terminal (not shown) of the protection circuit module 12 by welding.

More specifically, the connection member 13 has one portion 13A bonded to a connection terminal of the protection circuit module 12, and the other portion 13B of the connection member 13 is bent from one portion 13A to protrude outward so as to be bonded to the electrode leads 14, 15 of the battery cell 11.

However, a bent and extended portion of the connection member bonded to the electrode lead should be additionally bent while the conventional protection circuit module is installed to the battery cell. Accordingly, the installation work of the protection circuit module is complicated and the installation time is elongated.

Further, since the connection member has a complicated shape including one portion bonded to the connection terminal formed at the printed circuit board and the other portion bent and extended from the one portion, more manufacturing cost and more manufacturing time are required.

DISCLOSURE

Technical Problem

The present disclosure is designed to solve the problems of the related art, and therefore the present disclosure is directed to providing a pouch-type secondary battery pack having a simplified manufacturing process with a reduced number of components.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a pouch-type secondary battery pack, comprising:

a battery cell in which an electrode assembly is sealed in a pouch exterior together with an electrolyte, the battery cell having an electrode lead formed at one side thereof; and a protection circuit module having a first printed circuit board with a protection circuit formed on the first printed circuit board and a lead connection plate formed at a first surface of the first printed circuit board so that the first printed circuit board is electrically connected to the electrode lead of the battery cell, the protection circuit module having an exposing portion formed at a second surface of the first printed circuit board to expose at least a portion of the lead connection plate, the second surface of the first printed circuit board being opposite to the first surface.

Here, the lead connection plate may be formed as a single flat sheet.

Also, the lead connection plate may have a first surface and a second surface opposite to the first surface, at least a portion of the first surface of the lead connection plate being bonded to the first surface of the first printed circuit board, and the second surface of the lead connection plate being bonded to the electrode lead.

Moreover, the exposing portion may be a perforation hole perforated through an entire thickness of the first printed circuit board or may be a recessed groove inwardly recessed from an outer circumference of the first printed circuit board.

In addition, the protection circuit module may further include a protection circuit module (PCM) insulation pad made of an electrically insulating material and located at the second surface of the first printed circuit board.

Also, the pouch exterior may have an accommodation portion in which the electrode assembly and the electrolyte are accommodated and a sealing portion formed around the accommodation portion.

Moreover, the protection circuit module may be placed on a terrace portion so that a surface of the PCM insulation pad contacts an upper surface of the terrace portion of the sealing portion at which the electrode lead protrudes.

In addition, the PCM insulation pad may have a communicating portion configured to communicate with the exposing portion so that a portion of the lead connection plate is exposed to the outside.

Further, the communicating portion may have a communication hole communicating with the perforation hole and may be perforated through an entire thickness of the PCM insulation pad or may be an inwardly concave groove communicating with the recessed groove and inwardly recessed at an outer circumference of the PCM insulation pad.

Also, the first printed circuit board may have an embedded portion in which a portion of the PCM insulation pad is embedded.

Moreover, the embedded portion may be at least one of a fixing groove formed by inwardly digging a portion of the outer circumference of the first printed circuit board and a fixing hole inwardly recessed to a predetermined depth from the second surface of the first printed circuit board.

In addition, the fixing hole may be provided in plurality to be formed at two ends of the first printed circuit board, each fixing hole being equidistant from a center of the first printed circuit board.

Also, the PCM insulation pad may be formed by providing a hot-melt resin to the second surface of the first printed circuit board and curing the hot-melt resin.

Moreover, at least a portion of the PCM insulation pad may be made of a transparent material.

In addition, the protection circuit module may further include a second printed circuit board connected and coupled to an external input/output terminal formed at the first printed circuit board, and an inclined portion may be formed at a location of the second surface of the printed circuit board, which corresponds to a location at which the second printed circuit board is connected and coupled to the first surface of the first printed circuit board.

Advantageous Effects

If the pouch-type secondary battery pack according to an embodiment of the present disclosure is used, the lead connection plate and the electrode lead may be easily welded through the exposing portion formed at the printed circuit board, and the lead connection plate may have a reduced size, compared to the conventional art. In addition, it is unnecessary to bend the lead connection plate in the process of placing the protection circuit module on the terrace portion of the battery cell.

Thus, the pouch-type secondary battery pack of the present disclosure may reduce the size of components and simplify the manufacturing process, thereby ultimately reducing the manufacturing cost.

Also, according to an embodiment of the present disclosure, since the PCM insulation pad formed of a hot melt resin does not include a solvent containing a harmful component, it is possible to enhance the safety of a manufacturer and a user when the PCM insulation pad is used.

Moreover, according to an embodiment of the present disclosure, the PCM insulation pad of the present disclosure may stably protect devices and components mounted to the printed circuit board and also effectively prevent the devices and components from being damaged or deviated due to an external impact.

In addition, according to an embodiment the present disclosure, since the PCM insulation pad of the present disclosure is interposed between the terrace portion and the printed circuit board, it is possible to prevent the protection circuit module and the battery cell from being short-circuited or broken-down unintentionally.

Also, according to an embodiment of the present disclosure, since the PCM insulation pad of the present disclosure has a communicating portion in communication with the perforation hole or the recessed groove of the printed circuit board, it is possible to prevent the PCM insulation pad from contacting a welding rod and to cause no interfere with the scanned laser for welding, thereby ensuring the welding process to be performed smoothly and thus improving the manufacturing efficiency.

Further, according to an embodiment of the present disclosure, since the printed circuit board of the present disclosure has an embedded portion formed to prevent the PCM insulation pad from being easily detached due to an external impact, the PCM insulation pad may be fixed firmly to the other surface of the printed circuit board, thereby effectively improving the durability of the secondary battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
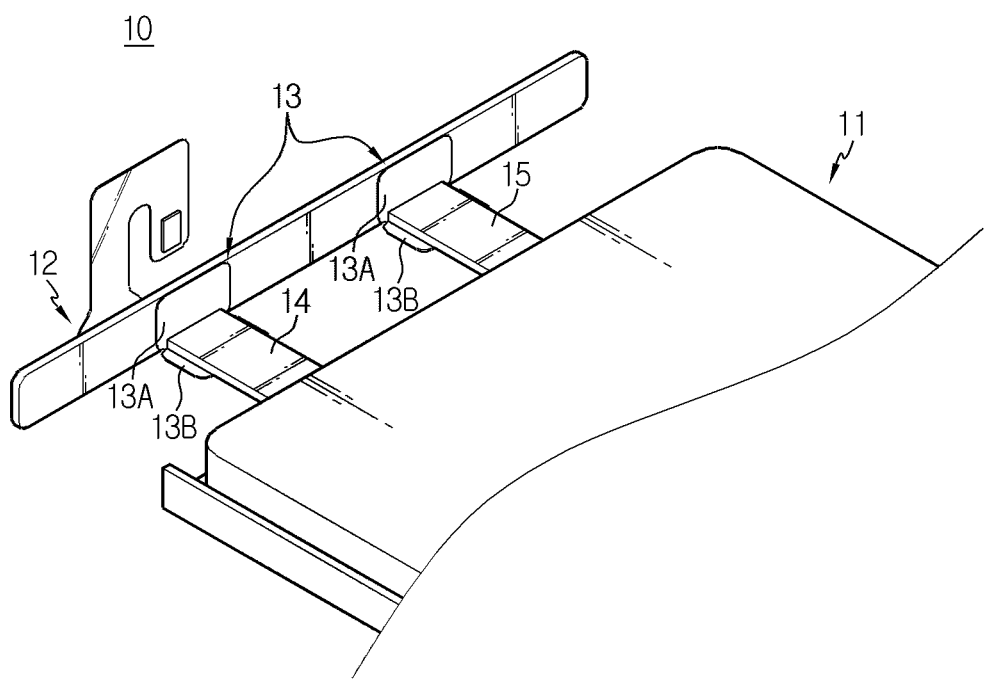
FIG. 1 is an exploded perspective view schematically showing some components of a conventional pouch-type secondary battery pack.
Figure 2:
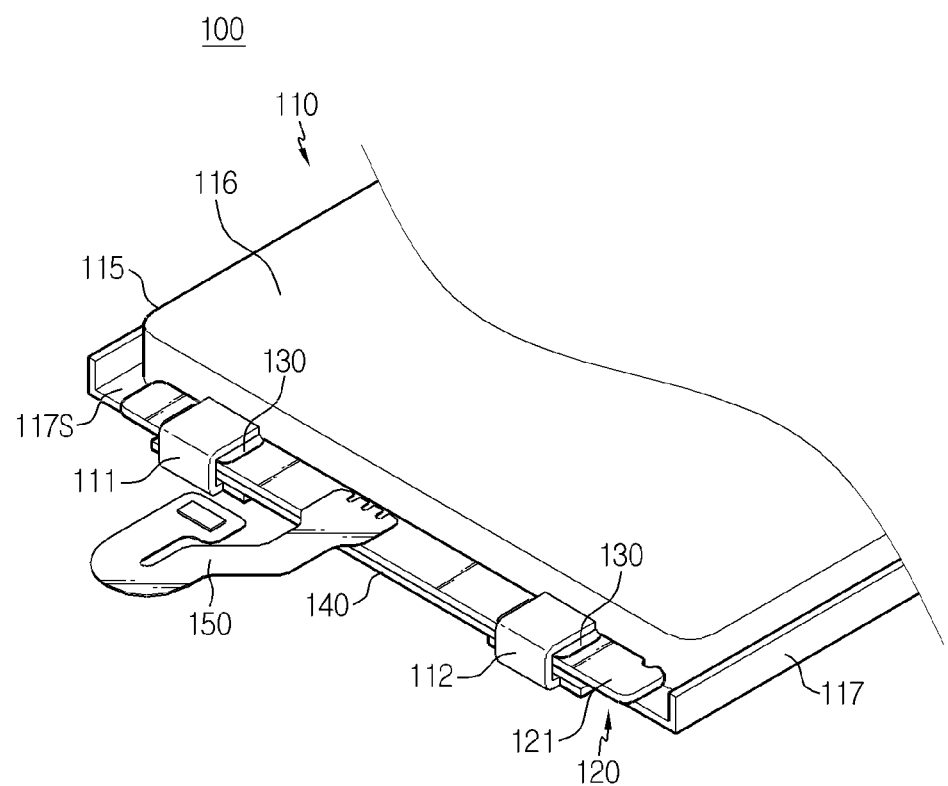
FIG. 2 is a perspective view schematically showing some components of a pouch-type secondary battery pack according to an embodiment of the present disclosure.

FIG. 2 is a perspective view schematically showing some components of a pouch-type secondary battery pack according to an embodiment of the present disclosure. In addition, FIG. 3 is a partial perspective view schematically showing some components of the pouch-type secondary battery pack according to an embodiment of the present disclosure.

Figure 3:
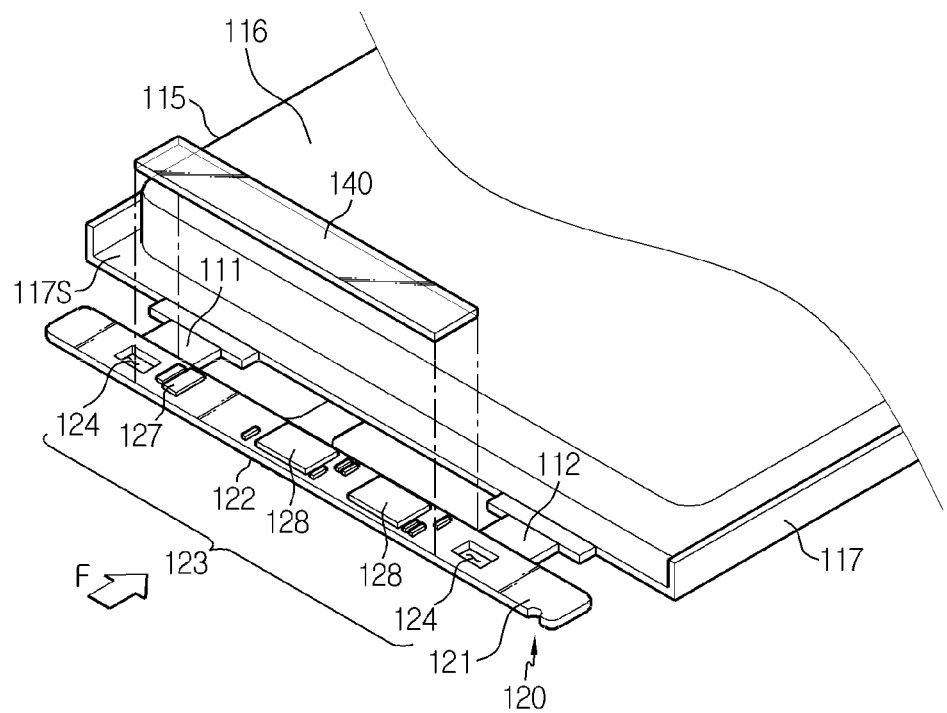
FIG. 3 is a partial perspective view schematically showing some components of the pouch-type secondary battery pack according to an embodiment of the present disclosure.

Referring to FIGS. 2 and 3, the pouch-type secondary battery pack 100 includes a battery cell 110 and a protection circuit module 120.

Here, the battery cell 110 may be a pouch-type battery cell. In particular, the pouch-type battery cell 110 may include an electrode assembly (not shown), an electrolyte (not shown), and a pouch exterior 115. Also, the electrode assembly may be sealed in the pouch exterior together with the electrolyte, and electrode leads 111, 112 may be formed at one side of the pouch-type battery cell 110.

In addition, the electrode assembly (not shown) may be configured such that at least one positive electrode plate and at least one negative electrode plate are disposed with a separator interposed therebetween. More specifically, the electrode assembly may be classified into a wound type in which one positive electrode plate and one negative electrode plate are wound together with a separator, a stacking type in which a plurality of positive electrode plates and a plurality of negative electrode plates are alternately stacked with a separator interposed therebetween, and the like.

Further, the pouch exterior 115 may be configured to have an outer insulating layer, a metal layer and an inner adhesive layer. The pouch exterior 115 may be configured to include a metal thin film, for example an aluminum thin film, in order to protect inner components such as the electrode assembly and the electrolyte, to enhance electrochemical properties by the electrode assembly and the electrolyte, and to improve heat dissipation.

Further, the aluminum thin film may be interposed between the insulating layers made of an insulating material to secure electrical insulation between components inside the battery cell 110, such as the electrode assembly and the electrolyte, or to other components outside the battery cell 110.

In addition, the pouch exterior 115 may be composed of two pouches, at least one of which may have a concave inner space formed therein. Also, the pouch exterior 115 may have an accommodation portion 116 in which the electrode assembly and the electrolyte are accommodated.

Moreover, the pouch exterior 115 may have a sealing portion 117 formed around the accommodation portion 116 by thermally fusing two pouches so that the inner space of the accommodation portion 116 accommodating the electrode assembly is sealed. For example, as shown in FIG. 2, a terrace portion 117S sealed may be formed at the front outer circumference of the pouch exterior 115.

Further, each pouch-type battery cell 110 may include electrode leads 111, 112, and the electrode leads 111, 112 may include a positive electrode lead 111 and a negative electrode lead 112. Here, each of the electrode leads 111, 112 has a plate shape, when being viewed in the direction F depicted in FIG. 3, so that two broad surfaces are respectively located at upper and lower portions.

Here, the terms indicating directions such as front, rear, left, right, upper and lower directions may be changed depending on the position of an observer or the shape of an object. For the sake of convenience of description, in the present specification, directions are classified into front, rear, left, right, upper and lower directions, based on the F direction.

For example, as shown in FIG. 2, one electrode lead 111 may be formed to protrude at one side of one side surface of the terrace portion 117S of the battery cell 110, and the other electrode lead 112 may be separated from one electrode lead 111 to protrude from the other side of one side surface of the terrace portion 117S.

The configuration of the pouch-type battery cell 110 described above is obvious to those skilled in the art and thus is not described in detail. In addition, the pouch-type secondary battery pack 100 according to the present disclosure may employ various battery cells known at the time of filing of this application.

In addition, the protection circuit module 120 may include a printed circuit board 121 at which a protection circuit is formed. In particular, the protection circuit module 120 may include a printed circuit board 121 and another printed circuit board 150 coupled to an external input/output terminal 122 of the printed circuit board 121.

At this time, the another printed circuit board 150 may have a connector (not shown) formed at one end thereof for the connection with other external devices. Further, the another printed circuit board 150 may be a flexible printed circuit board (FPCB) having a flexible substrate.

Further, the protection circuit module 120 may include a lead connection plate 130 formed at one surface of the printed circuit board 121 so that the printed circuit board 121 is electrically connected to the electrode leads 111, 112 of the battery cell 110.

Figure 4:
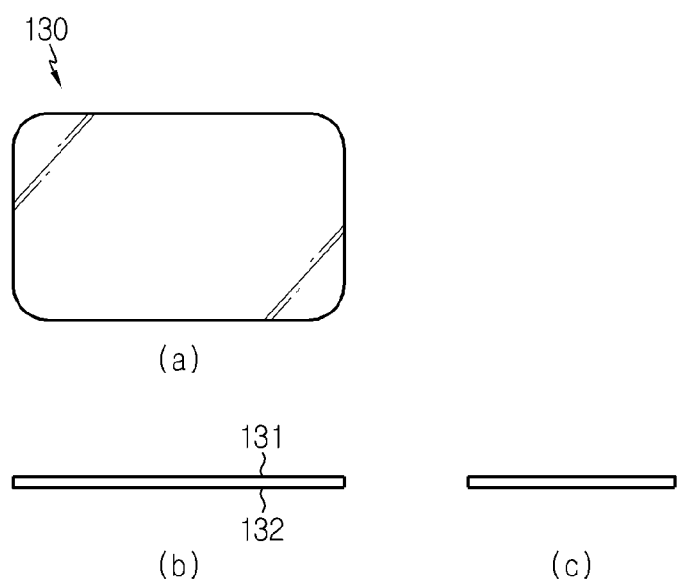
FIG. 4 is a plane view (a), a front view (b) and a side view (c) schematically showing a lead connection plate of the pouch-type secondary battery pack according to an embodiment of the present disclosure.

FIG. 4 is a plane view (a), a front view (b) and a side view (c) schematically showing a lead connection plate of the pouch-type secondary battery pack according to an embodiment of the present disclosure.

Referring to FIG. 4 along with FIG. 2, the lead connection plate 130 may be formed with a single flat sheet. In addition, the lead connection plate 130 may be mounted to have a plane parallel to one surface of the printed circuit board 121. Further, one surface 131 of the lead connection plate 130 may be bonded to a connection terminal (not shown) formed at the printed circuit board 121, and the other surface 132 may be bonded to the electrode leads 111, 112 of the battery cell 110.

For example, as shown in FIG. 2, the protection circuit module 120 may have two lead connection plates 130 coupled and connected to two electrode leads 111, 112, and the lead connection plate 130 may be mounted to have a plane parallel to one surface of the printed circuit board 121.

Thus, according to this configuration of the present disclosure, since the lead connection plate is formed with a single sheet, unlike the conventional art, the process of bending the lead connection plate may not be performed in the process of placing the protection circuit module on the terrace portion of the battery cell. Also, the shape of the lead connection plate is not complicated, compared with a conventional member, and the lead connection plate is formed in a smaller size, thereby reducing the manufacturing cost.

Referring to FIG. 3 along with FIG. 2 again, an exposing portion 123 may be formed at the other surface of the printed circuit board 121 to expose at least a portion of the lead connection plate 130.

Specifically, the exposing portion 123 may have an opened shape such that one surface of the lead connection plate 130 is heated so that the other surface of the lead connection plate 130 is fused and bonded to the electrode leads 111, 112 of the battery cell 110. Accordingly, the exposing portion 123 may have an appropriate size so that the lead connection plate 130 may be welded and coupled to the electrode leads 111, 112.

For example, as shown in FIG. 3, the exposing portion 123 may be a perforation hole 124 perforated from one surface to the other surface of the printed circuit board 121. In addition, two perforation holes 124 may be formed at both sides of the printed circuit board 121 based on a center thereof. The perforation holes 124 may be formed in a rectangular shape at both sides of the printed circuit board 121, in a plane view.

Thus, according to this configuration of the present disclosure, since the lead connection plate 130 and the electrode leads 111, 112 may be welded easily through the exposing portion 123, the lead connection plate 130 and the electrode leads 111, 112 may be bonded easily by welding or the like.

Figure 5:
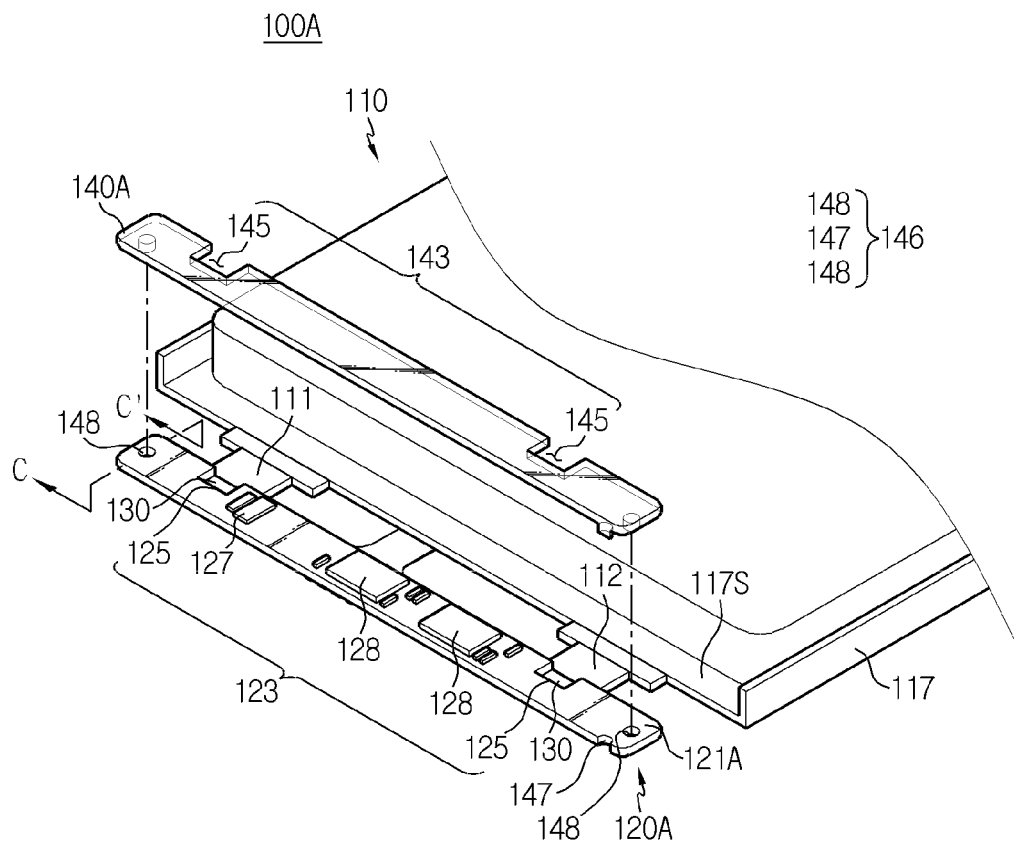
FIG. 5 is a partial perspective view schematically showing some components of a pouch-type secondary battery pack according to another embodiment of the present disclosure.

FIG. 5 is a partial perspective view schematically showing some components of a pouch-type secondary battery pack according to another embodiment of the present disclosure. In addition, FIG. 6 is a side view schematically showing a part of the pouch-type secondary battery pack according to another embodiment, depicted in FIG. 5.

Figure 6:
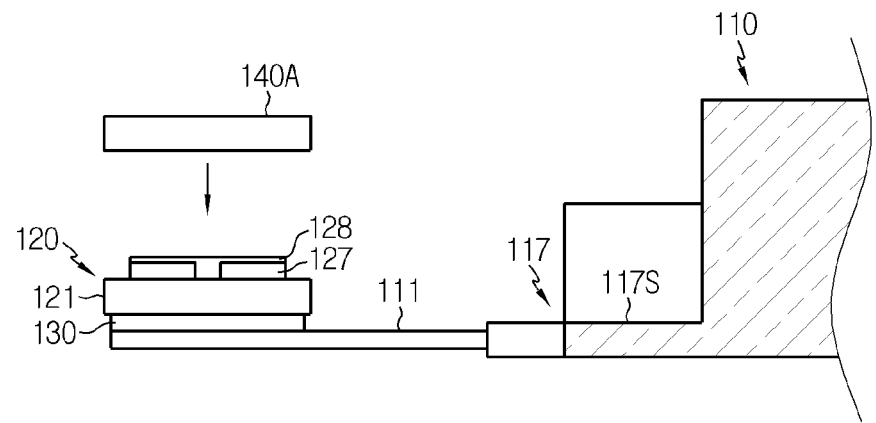
FIG. 6 is a side view schematically showing a part of the pouch-type secondary battery pack according to another embodiment, depicted in FIG. 5.

Referring to FIGS. 5 and 6, the exposing portion 123 may be a recessed groove 125 inwardly recessed at an outer circumference of the printed circuit board 121A of the protection circuit module 120A. Specifically, the recessed groove 125 may have an inwardly recessed structure at the outer circumferential surface of the rear side of the printed circuit board 121A.

For example, as shown in FIG. 5, two recessed grooves 125 may be formed at both sides of the printed circuit board 121A based on the center thereof.

Thus, according to this configuration of the present invention, compared with the perforation hole 124 (FIG. 3), the recessed groove 125 is shaped so that one side is opened to the outside, thereby reducing the case that the exposing portion 123 interferes with another object. Thus, it is easier to allow a welding tool to contact the lead connection plate 130 during a welding process or to set a target to which heat is applied by laser irradiation or the like at a predetermined distance.

Further, a plurality of elements 127 or parts 128 may be mounted to the printed circuit board 121A. Here, the elements 127 and the parts 128 are general elements and parts used in the secondary battery pack 100A and will not be described in detail here.

Meanwhile, referring to FIG. 3 again, the protection circuit module 120 may further include a PCM insulation pad 140 made of an electrically insulating material. Also, the PCM insulation pad 140 may be provided at the other surface of the printed circuit board 121 so as not to cover the exposing portion 123. For example, as shown in FIG. 3, the PCM insulation pad 140 may be positioned between two perforation holes 124.

Here, the electrically insulating material may be a polymer compound with a low electrical conductivity. For example, the PCM insulation pad 140 may be made of a polymeric resin, silicone, rubber, or the like.

Further, the PCM insulation pad 140 may be formed by curing a hot-melt type polymer resin.

More specifically, the hot-melt type resin may be a hot-melt resin. The hot-melt resin is a solvent-free resin and may be a thermoplastic resin that is solid at normal temperature but is melted at a melting point or higher when heated and is solidified by cooling to form an adhesive.

Thus, according to this configuration of the present disclosure, the PCM insulation pad 140 made of a hot-melt resin does not contain a solvent containing harmful components. Thus, if the PCM insulation pad 140 is used, the safety of a manufacturer and a user may be enhanced.

In addition, the PCM insulation pad 140 may be located at the other surface of the printed circuit board 121 on which the elements 127 and the parts 128 are mounted. That is, the PCM insulation pad 140 may be formed by mounting the elements 127 and the parts 128 on the other surface of the printed circuit board 121, applying a molten high-temperature resin to the upper surface, and then cooling the applied resin to be cured.

Thus, according to this configuration of the present disclosure, the PCM insulation pad 140 may stably protect the elements 127 and the parts 128 mounted to the printed circuit board 121. Accordingly, in the present disclosure, it is possible to effectively prevent the elements 127 and the parts 128 of the printed circuit board 121 from being damaged or deviated due to an external impact.

In addition, at least a portion of the PCM insulation pad 140 may be made of a transparent material from one surface to the other surface thereof. Specifically, the PCM insulation pad 140 may include a transparent material so that the elements and the parts mounted to the printed circuit board 121 may be checked by naked eyes.

For example, as shown in FIG. 3, the PCM insulation pad 140 may be entirely formed of a transparent material so that the other surface of the printed circuit board 121 is observed.

Figure 7:
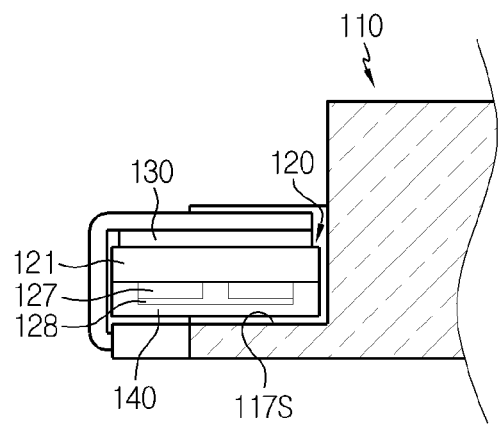
FIG. 7 is a side view schematically showing that the protection circuit module of the pouch-type secondary battery pack according to an embodiment of the present disclosure is placed on the terrace portion.

FIG. 7 is a side view schematically showing that the protection circuit module of the pouch-type secondary battery pack according to an embodiment of the present disclosure is placed on the terrace portion.

Referring to FIG. 7 along with FIG. 6, the protection circuit module 120 may be placed on the terrace portion 117S so that the other surface of the PCM insulation pad 140 is in contact with the upper surface of the terrace portion 117S, where the electrode leads 111, 112 protrude on the sealing portion 117 of the battery cell 110.

In other words, if the protection circuit module 120 is placed on the terrace portion 117S of the battery cell 110, the PCM insulation pad 140 may be interposed between the other surface of the printed circuit board 121 and the terrace portion 117S.

Thus, according to this configuration of the present disclosure, since the PCM insulation pad 140 is interposed between the terrace portion 117S and the printed circuit board 121, it is possible to prevent the protection circuit module 120 and the battery cell 110 from being short-circuited or broken-down unintentionally.

Further, in the conventional art, an insulating tape is separately attached to the terrace portion 117S to prevent a short circuit between the protection circuit module 120 and the battery cell 110. However, in the present disclosure, the PCM insulation pad 140 may electrically insulate the protection circuit module 120 and the battery cell 110 without attaching such an insulating tape.

In addition, one surface of the PCM insulation pad 140 contacting the printed circuit board 121 may be formed along an outer surface of the elements 127 and the parts 128 of the printed circuit board 121.

Figure 8:
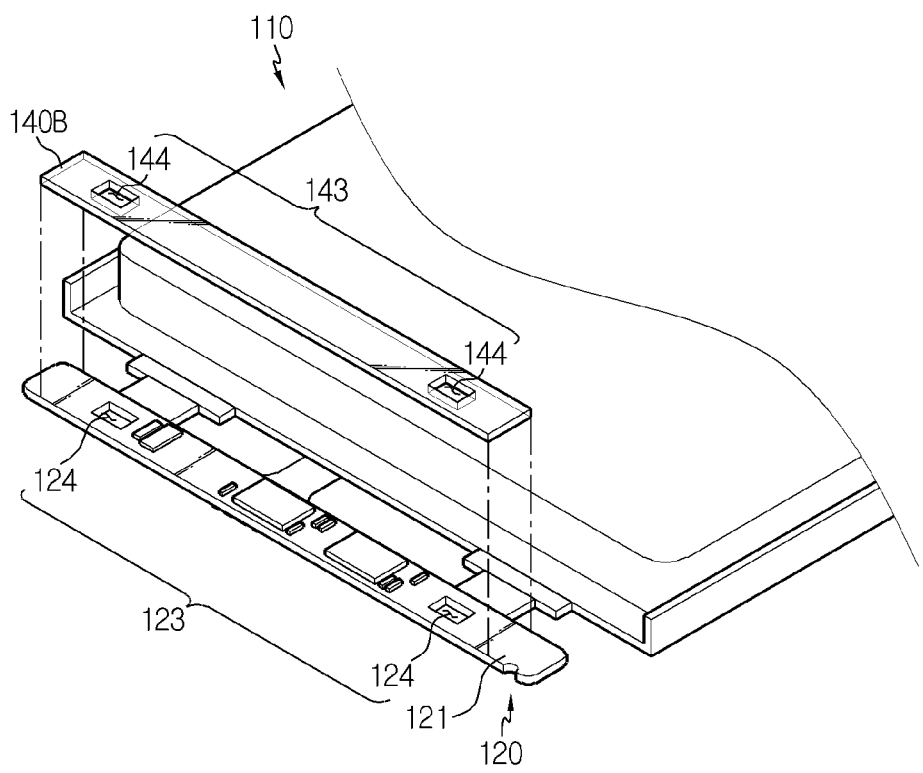
FIG. 8 is a partial perspective view schematically showing some components of a pouch-type secondary battery pack according to another embodiment of the present disclosure.

FIG. 8 is a partial perspective view schematically showing some components of a pouch-type secondary battery pack according to another embodiment of the present disclosure.

Referring to FIG. 8 along with FIG. 6, a PCM insulation pad 140B according to another embodiment may have a communicating portion 143 formed to communicate with the exposing portion 123 so that a portion of the lead connection plate 130 is exposed to the outside.

Specifically, the communicating portion 143 may be a communication hole 144 communicating with the perforation hole 124 and perforated from one surface to the other surface of the PCM insulation pad 140B. For example, as shown in FIG. 8, two communication holes 144 may be formed to communicate with the perforation hole 124 formed in the printed circuit board 121, and the communication holes 144 may be formed at both sides of the printed circuit board 121 based on the center thereof.

Referring to FIG. 5 again, in the PCM insulation pad 140A according to another embodiment, the communicating portion 143 may be an inwardly concave groove 145.

Specifically, the inwardly concave groove 145 may communicate with the recessed groove 125 and be inwardly recessed from the outer circumference of the PCM insulation pad 140A.

For example, as shown in FIG. 5, two inwardly concave grooves 145 may be formed to communicate with two recessed grooves 125 formed at the printed circuit board 121A, and the inwardly concave grooves 145 may be formed at both sides of the printed circuit board 121A based on the center thereof.

Thus, according to this configuration of the present disclosure, one surface of the lead connection plate 130 may be heated through the communicating portion 143 formed at the PCM insulation pad 140A so that the other surface of the lead connection plate 130 is easily bonded to the electrode the leads 111, 112 of the battery cell 110. That is, since the communicating portion 143 is formed to communicate with the perforation hole 124 or the recessed groove 125, it is possible to prevent the PCM insulation pad 140A from contacting a welding rod and to cause no interfere with the scanned laser for welding, thereby ensuring the welding process to be performed smoothly.

Meanwhile, referring to FIG. 5, the printed circuit board 121A may have an embedded portion 146 in which a portion of the PCM insulation pad 140A is embedded.

Specifically, the embedded portion 146 may have a fixing groove 147 formed by inwardly digging a portion of the outer circumference of the printed circuit board 121A. For example, as shown in FIG. 5, the fixing groove 147 may be formed at the right side of the printed circuit board 121A to be inwardly dug further to the other region. In addition, a portion of the PCM insulation pad 140A may be embedded or inserted into the fixing groove 147.

Thus, according to this configuration of the present disclosure, the PCM insulation pad 140 may be fixed to the other surface of the printed circuit board 121A by the fixing groove 147 so that the PCM insulation pad 140 is not easily deviated due to an external impact. Accordingly, the durability of the product according to the present disclosure may be effectively improved.

Referring to FIG. 5 again, the embedded portion 146 may have a fixing hole 148 formed to be inwardly recessed to a predetermined depth from the other surface of the printed circuit board 121A. In addition, the fixing hole 148 may be formed to be perforated from one surface to the other surface of the printed circuit board 121A.

Figure 9:
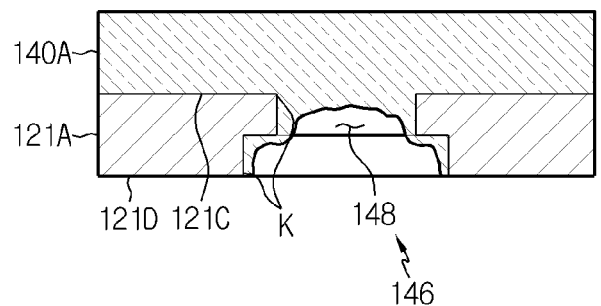
FIG. 9 is a cross-sectioned view, taken along a dotted line C' of FIG. 5.

FIG. 9 is a cross-sectioned view, taken along a dotted line C' of FIG. 5.

Referring to FIG. 9, the printed circuit board 121A according to another embodiment of the present disclosure has a fixing hole 148 formed at the embedded portion 146 to be inwardly recessed to a predetermined depth from the other surface of the printed circuit board 121A to serve as the embedded portion 146.

For example, as shown in FIG. 9, the fixing hole 148 may be perforated from one surface 121C to the other surface 121D of the printed circuit board 121A. At this time, the fixing hole 148 may have a stepped structure K whose diameter gradually increases from one surface 121C to the other surface 121D of the printed circuit board 121A. In addition, a portion of the PCM insulation pad 140A may be applied along the inner wall of the interior space of the fixing hole 148.

Also, a portion of the PCM insulation pad 140A is embedded in the fixing hole 148 to fix the PCM insulation pad 140A to the other surface of the printed circuit board 121A so that the PCM insulation pad 140A is not easily deviated due to an external impact.

Further, the fixing hole 148 may be formed at both sides of the printed circuit board 121A based on the center thereof. For example, as shown in FIG. 5, two fixing holes 148 may be formed at both sides of the printed circuit board 121A based on the center thereof, respectively. Thus, since a portion of both sides of the PCM insulation pad 140 is embedded or inserted into the fixing hole 148, the PCM insulation pad 140A may be stably fixed to the other surface of the printed circuit board 121A.

Figure 10:
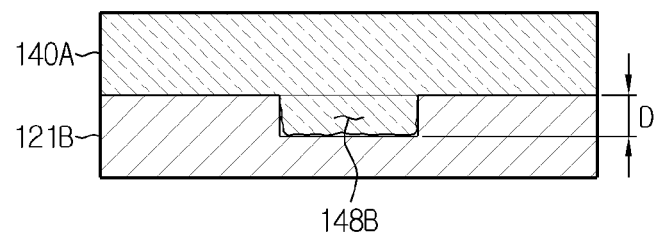
FIG. 10 is a cross-sectioned view schematically showing a portion of a printed circuit board, employed at a pouch-type secondary battery pack according to still another embodiment of the present disclosure.

FIG. 10 is a cross-sectioned view schematically showing a portion of a printed circuit board, employed at a pouch-type secondary battery pack according to still another embodiment of the present disclosure.

Referring to FIG. 10, a fixing hole 148B according to another embodiment may be formed by digging one surface of the printed circuit board 121B to a predetermined depth D. Also, a portion of the PCM insulation pad 140A may be embedded in the inner space of the fixing hole 148B.

Thus, according to this configuration of the present disclosure, it is possible to prevent a portion of the PCM insulation pad 140A from being lost to the outside through the fixing hole 148B, thereby reducing defective products caused by contamination of the melted PCM insulation pad 140A.

Figure 11:
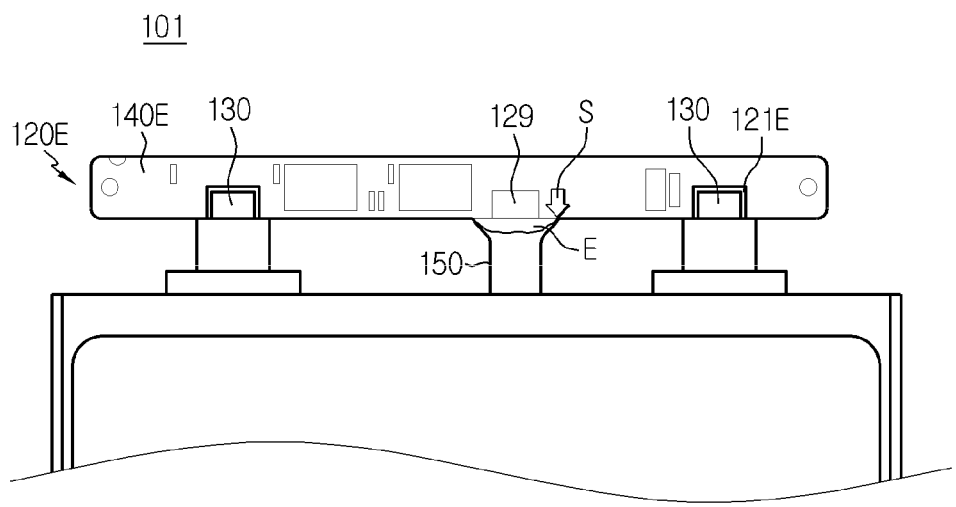
FIG. 11 is a partial plane view schematically showing the protection circuit module of the pouch-type secondary battery pack according to another embodiment of the present disclosure.

FIG. 11 is a partial plane view schematically showing the protection circuit module 120E of the pouch-type secondary battery pack according to another embodiment of the present disclosure.

Referring to FIG. 11, a secondary battery pack 101 according to another embodiment may have an inclined portion 129 formed at the printed circuit board 121E to have a thickness gradually decreasing in an outer direction S from the inside.

Specifically, the inclined portion 129 may be formed at a location on the other surface of the printed circuit board 121 corresponding to a location where another printed circuit board 150 is connected and coupled to one surface of the printed circuit board 121E.

In addition, when the PCM insulation pad 140E is formed, the inclined portion 129 may allow the applied molten resin to flow down along the inclined portion 129 and to be applied to one portion E of another printed circuit board 150.

Further, the melted resin applied to one portion E of another printed circuit board 150 is formed as a portion of the PCM insulation pad 140E after it is cured. Also, another printed circuit board 150 may be fixed on the printed circuit board 121 by means of the adhesive force of the PCM insulation pad 140E.

Thus, according to this configuration of the present disclosure, since the melted resin is formed as portion of the PCM insulation pad 140E on another printed circuit board 150 along the inclined portion 129 of the present disclosure, it is possible to effectively prevent another printed circuit board 150 from being deviated from the printed circuit board 121E due to an external impact.

Meanwhile, even though the terms indicating directions such as upper, lower, left, right, front and rear directions are used in the specification, it is obvious to those skilled in the art that these merely represent relative locations for convenience in explanation and may vary based on a location of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

| Reference Signs | |
|---|---|
| 100, 101: pouch-type secondary battery pack | 120: protection circuit module |
| 110: battery cell | 121: printed circuit board |
| 115: pouch exterior | 122: external input/output terminal |
| 111, 112: electrode lead | 129: inclined portion |
| 117: sealing portion | 130: lead connection plate |
| 117S: terrace portion | 123: exposing portion |
| 116: accommodation portion | 124: perforation hole |
| 140: PCM insulation pad | 125: recessed groove |
| 143: communicating portion | 146: embedded portion |
| 144: communication hole | 147: fixing groove |
| 145: inwardly concave groove | 148: fixing hole |

INDUSTRIAL APPLICABILITY

The present disclosure relates to a pouch-type secondary battery pack. In addition, the present disclosure is available for industries associated with electric devices or vehicles including the pouch-type secondary battery pack.

What is claimed is:

1. A pouch-type secondary battery pack, comprising:
a battery cell in which an electrode assembly is sealed in a pouch exterior together with an electrolyte, the battery cell having an electrode lead formed at one side thereof; and
a protection circuit module having a first printed circuit board with a protection circuit formed on the first printed circuit board and a lead connection plate formed at a first surface of the first printed circuit board so that the first printed circuit board is electrically connected to the electrode lead of the battery cell, the protection circuit module having an exposing portion formed at a second surface of the first printed circuit board to expose at least a portion of the lead connection plate, the second surface of the first printed circuit board being opposite to the first surface,
wherein the electrode lead surrounds a top surface of the lead connection plate.

2. The pouch-type secondary battery pack according to claim 1,
wherein the lead connection plate is a single flat sheet, and
wherein the lead connection plate has a first surface and a second surface opposite to the first surface, at least a portion of the first surface of the lead connection plate being bonded to the first surface of the first printed circuit board, and the second surface of the lead connection plate being bonded to the electrode lead.

3. The pouch-type secondary battery pack according to claim 1,
wherein the exposing portion is a perforation hole perforated through an entire thickness of the first printed circuit board or is a recessed groove inwardly recessed from an outer circumference of the first printed circuit board.

4. The pouch-type secondary battery pack according to claim 3,
wherein the protection circuit module further includes a protection circuit module (PCM) insulation pad made of an electrically insulating material and located at the second surface of the first printed circuit board.

5. The pouch-type secondary battery pack according to claim 4,
wherein the pouch exterior has an accommodation portion in which the electrode assembly and the electrolyte are accommodated and a sealing portion formed around the accommodation portion, and
wherein the protection circuit module is placed on a terrace portion so that a surface of the PCM insulation pad contacts an upper surface of the terrace portion of the sealing portion at which the electrode lead protrudes.

6. A pouch-type secondary battery pack, comprising:
a battery cell in which an electrode assembly is sealed in a pouch exterior together with an electrolyte, the battery cell having an electrode lead formed at one side thereof; and
a protection circuit module having a first printed circuit board with a protection circuit formed on the first printed circuit board and a lead connection plate formed at a first surface of the first printed circuit board so that the first printed circuit board is electrically connected to the electrode lead of the battery cell, the protection circuit module having an exposing portion formed at a second surface of the first printed circuit board to expose at least a portion of the lead connection plate, the second surface of the first printed circuit board being opposite to the first surface,
wherein the protection circuit module further includes a protection circuit module (PCM) insulation pad made of an electrically insulating material and located at the second surface of the first printed circuit board, and
wherein the PCM insulation pad has a communicating portion configured to communicate with the exposing portion so that a portion of the lead connection plate is exposed to the outside.

7. The pouch-type secondary battery pack according to claim 6,
wherein the exposing portion is a perforation hole perforated through an entire thickness of the first printed circuit board or is a recessed groove inwardly recessed from an outer circumference of the first printed circuit board, and
wherein the communicating portion has a communication hole communicating with the perforation hole and is perforated through an entire thickness of the PCM insulation pad or is an inwardly concave groove communicating with the recessed groove and inwardly recessed at an outer circumference of the PCM insulation pad.

8. The pouch-type secondary battery pack according to claim 4,
wherein the first printed circuit board has an embedded portion in which a portion of the PCM insulation pad is embedded.

9. The pouch-type secondary battery pack according to claim 8,
wherein the embedded portion is at least one of a fixing groove formed by inwardly digging a portion of the outer circumference of the first printed circuit board and a fixing hole inwardly recessed to a predetermined depth from the second surface of the first printed circuit board.

10. The pouch-type secondary battery pack according to claim 9,
wherein the fixing hole is provided in plurality and is formed at two ends of the first printed circuit board, each fixing hole being equidistant from a center of the first printed circuit board.

11. The pouch-type secondary battery pack according to claim 4,
wherein the PCM insulation pad is a cured hot-melt resin formed at the second surface of the first printed circuit board.

12. The pouch-type secondary battery pack according to claim 4,
wherein at least a portion of the PCM insulation pad is made of a transparent material.

13. The pouch-type secondary battery pack according to claim 4,
wherein the protection circuit module further includes a second printed circuit board connected and coupled to an external input/output terminal formed at the first printed circuit board, and an inclined portion is formed at a location of the second surface of the first printed circuit hoard, which corresponds to a location at which the second printed circuit board is connected and coupled to the first surface of the first printed circuit board.

14. A pouch-type secondary battery pack, comprising:
a battery cell in which an electrode assembly is sealed in a pouch exterior together with an electrolyte, the battery cell having an electrode lead formed at one side thereof; and
a protection circuit module having a printed circuit board with a protection circuit formed thereon, a lead connection plate formed at a first surface of the printed circuit board so that the printed circuit board is electrically connected to the electrode lead of the battery cell, and a PCM insulation pad made of a cured resin formed at a second surface of the printed circuit board opposite to the first surface of the printed circuit board,
wherein an exposing portion is formed at the second surface of the printed circuit board to expose at least a portion of the lead connection plate, and
wherein the electrode lead surrounds a top surface of the lead connection plate.

15. The pouch-type secondary battery pack according to claim 14, wherein the electrode lead further surrounds a front surface of the lead connection plate and a bottom surface of the protection circuit module.

16. The pouch-type secondary battery pack according to claim 14, wherein the printed circuit board has an embedded portion in which a portion of the PCM insulation pad is embedded, and
wherein the embedded portion is at least one of a fixing groove formed by inwardly digging a portion of an outer circumference of the first printed circuit board and a fixing hole inwardly recessed to a predetermined depth from the second surface of the first printed circuit board.

17. The pouch-type secondary battery pack according to claim 1, wherein the electrode lead further surrounds a front surface of the lead connection plate and a bottom surface of the protection circuit module.

18. The pouch-type secondary battery pack according to claim 1, wherein the protection circuit module further includes a protection circuit module (PCM) insulation pad made of an electrically insulating material and located at the second surface of the first printed circuit board, wherein the first printed circuit board has an embedded portion in which a portion of the PCM insulation pad is embedded, and wherein the embedded portion is at least one of a fixing groove formed by inwardly digging a portion of an outer circumference of the first printed circuit board and a fixing hole inwardly recessed to a predetermined depth from the second surface of the first printed circuit board.

\* \* \* \* \*